United States Patent [19]

Sosa et al.

[11] Patent Number: 5,403,556
[45] Date of Patent: Apr. 4, 1995

[54] APPARATUS FOR INJECTING SOLID INSOLUBLE ADDITIVES INTO POLYMERIZATION STREAMS

[75] Inventors: Jose M. Sosa, Deerpark; Stan Beisert, Houston, both of Tex.

[73] Assignee: Fina Technology, Inc., Dallas, Tex.

[21] Appl. No.: 621,398

[22] Filed: Nov. 30, 1990

[51] Int. Cl.$^6$ .................. C08F 2/00; B01F 7/00; B01J 8/00; B01D 11/02
[52] U.S. Cl. .................. 422/132; 422/135; 422/138; 422/226; 422/234; 422/269
[58] Field of Search ............. 422/226, 234, 235, 132, 422/138, 135, 269, 281, 901, 110

[56] References Cited

U.S. PATENT DOCUMENTS

| | | | |
|---|---|---|---|
| 4,089,365 | 5/1978 | Miserlis et al. | 422/138 |
| 4,157,427 | 6/1979 | Ferber | 422/135 |
| 4,902,666 | 2/1990 | Rainis | 502/439 |

Primary Examiner—Robert J. Warden
Assistant Examiner—Christopher Y. Kim
Attorney, Agent, or Firm—Michael J. Caddell; M. Norwood Cheairs

[57] ABSTRACT

Process and apparatus are disclosed for improved additive systems for polymerization processes, which improved systems comprise a slurry additive system having a high shear mixer for mixing a carrier fluid and the solid additives and maintaining them in a suspension slurry prior to injecting them into a polymerization system.

12 Claims, 2 Drawing Sheets

APPARATUS FOR INJECTING SOLID INSOLUBLE ADDITIVES INTO POLYMERIZATION STREAMS

FIELD OF THE INVENTION

This invention relates to the field of polymerizing monovinyl aromatic compounds and more particularly discloses methods and apparatus for adding thermally-sensitive and oxidation-sensitive additives and anti-oxidants to the reactants in a monovinylaromatic polymerization system prior to or during the polymerization process.

BACKGROUND OF THE INVENTION

Of all the thermoplastics manufactured today, probably the most versatile and most widely used class of materials is polymerized monovinyl aromatic compounds such as polystyrene, polymerized alpha-methyl styrene, and polymers of ring-substituted styrenes.

Virgin polystyrene manufactured by the polymerization of styrene monomer often requires the inclusion therein of additives such as pigments, stabilizers, anti-foaming agents, mold-release agents, plasticizers, and anti-oxidants. Plasticizers such as mineral oil and mold-release and stabilizer agents such as zinc stearate are necessary in the polymer to allow it to be formed in thermoforming equipment into the final consumer products. Anti-oxidants such as Irganox 1076, a hindered phenol manufactured by Ciba-Geigy Corporation of Greensboro, N.C., are necessary to prevent the polymer from degrading with age and from exposure to ultra violet light from sources such as sunlight and artificial lighting.

As already mentioned, one of the most desirable, if not the most desirable, lubricant and mold-release agents added to polystyrene and other polymerized monovinyl aromatic compounds is zinc stearate. In conventional polymerization systems, zinc stearate is added to the process by first melting it in a closed heated vessel at 120° to 130° C. and then pumping it into the polymerization system at the desired location. The problems with this approach are many.

First, the molten zinc stearates, as well as other additives, oxidize easily at temperatures above their melting points, and must be completely shut off from any traces of air to prevent oxidation of the material, which causes yellow discoloration of the finished polymer. This is normally achieved by maintaining the headspace in the melting vessel filled with nitrogen.

Second, feeding problems often occur when trying to transport molten zinc stearate to the polymerization system. If any traces of air were allowed to leak in through the lines or fittings to the melt, the afore-mentioned oxidation will occur. Also, if the stearate supply piping were not maintained above the melt temperature of the stearate, the material would begin to solidify and precipitate out, clogging the lines or allowing solid chunks of the material into the polymerization process, adulterating the finished polymer.

SUMMARY OF THE INVENTION

The present invention discloses methods and apparatus for adding additives such as plasticizers, stabilizers, mold-release agents and anti-oxidants into polymerization processes, and more particularly discloses methods and apparatus for adding mineral oil, zinc stearate and hindered phenol compounds to polymerization systems by forming a slurry of the additives in an agitated vessel and injecting the slurry into the process at the desired location, or locations, at easily controlled temperatures.

DESCRIPTION OF THE PREFERRED EMBODIMENTS

Figure 1:
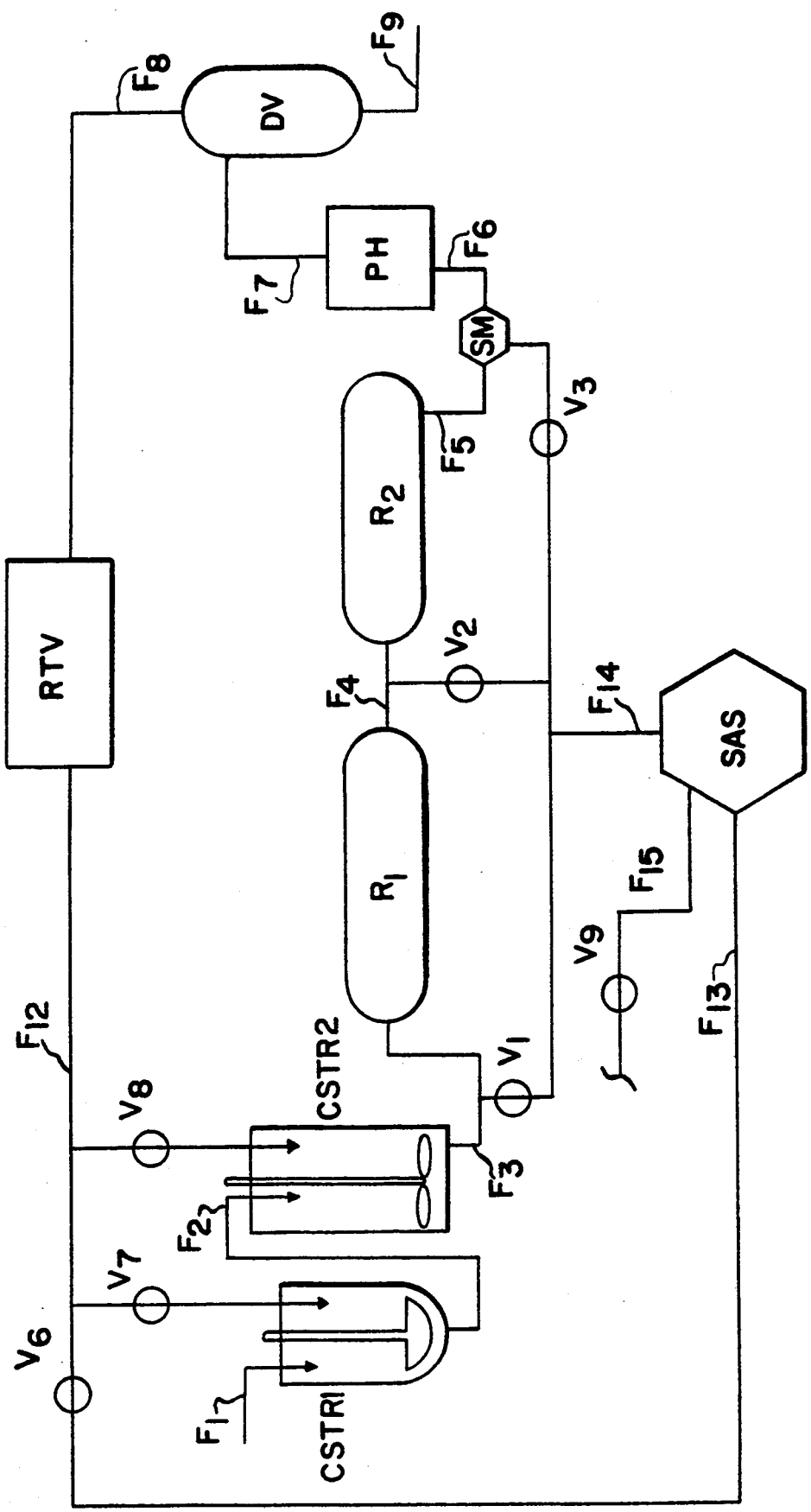
FIG. 1 is a schematic diagram of a typical monovinyl aromatic polymerization process illustrating the present invention in place therein.

Referring to the illustration of FIG. 1, this is a schematic diagram of a typical high impact polystyrene (HIPS) manufacturing process. Such a process is more particularly described in U.S. Pat. No. 4,857,587 in the name of Sosa et al, entitled "Continuous Process Including Recycle Stream Treatment for the Production of High Impact Polystyrene", which patent is hereby incorporated by reference in its entirety into the present application. In a typical high impact polystyrene process, such as that illustrated in FIG. 1, refined styrene monomer feed is fed through flow line F1 into a stirred tank reactor (CSTR1) which is a continuous stirred tank reactor. Styrene, polybutadiene, a free-radical initiator, and additional components such as solvents, anti-oxidants, dyes, and other additives are fed into the reactor through feed line F1. As used herein, the term "styrene" includes a variety of substituted styrenes, such as alpha-methyl styrene, ring-substituted styrenes, such as p-methylstyrene and p-chlorostyrene, as well as unsubstituted styrene. Typically, the mixture in polymerization reactor CSTR1 will comprise about 75 to 99% by weight refined styrene, about 1 to 15% by weight polybutadiene, and the remainder being free-radical initiator and additional components.

The feed components fed through line F1 are stirred in the CSTR1 and reaction between the components is initiated therein. The components are then fed through flow line F2 into a second continuous stirred tank reactor CSTR2 for additional reaction and agitation by stirring. From there the HIPS components are transferred through flow line F3 into an initial polymerization reactor R1. A series of reactors R1, and R2, each comprising horizontal polymerization reactors may be used for the total polymerization process of the HIPS material. The polymerized styrene/butadiene mixture then exits reactor R2 and passes through flowline F5 to an optional static mixer SM and from there through flow line F6 into a preheater PH. From the preheater the polymerized product flows through line F7 into a devolatilizer DV where volatile components are transferred through line F10 to the recycle treatment vessel RTV. The finished HIPS material then exits DV through line F9 to the product finishing line where it may be pelletized or put into other transportable forms. The volatile elements removed in the devolatilizer DV are then passed through vessel RTV which usually comprises a filter bed such as clay to remove the acid components from the recycle stream. The refined recycle stream then moves through line F12 and may be recycled into the CSTR1 or CSTR2.

The description given above is that of a typical high impact polystyrene manufacturing system described from a schematic or flow diagram viewpoint. The present invention involves the use of a slurry additive system for adding components such as anti-oxidants, stabilizers, mold-release agents, and other desirable compounds. The slurry additive system is more particularly described in FIG. 2 and is designated schematically at SAS and is shown with a feed input line F13 and a slurry supply line F14. Line F13, by means of manipulation of valves V6, V7, and V8, is arranged to provide recycled monomer from the RTV into the slurry additive system as a carrier for the additive to be injected into the polymerization reactor system R1–R2.

The recycle stream entering the SAS vessel through F13 is slurried with the desirable additive, such as the previously mentioned zinc stearate and hindered phenol additives, to be injected into the polymerization system by manipulating valves V1 through V3. Injection of the additive slurry may be directed at any point in the polymerization process: by closing all valves except V1 the additive slurry may be injected prior to the polymerization reactor R1. Likewise, by opening valve V2, and V3 and closing all the other valves, the injection points may be moved to the various locations shown in the drawings. The opening of valve V3 and closing of valves V1 and V2 introduces the additive slurry into the system after the final reactor vessel R2.

In this case, the optional static mixer SM must be utilized to thoroughly compound the additive slurry into the polymer stream. As previously mentioned, the static mixer SM is an optional element and is intended for the particular embodiment wherein the additive slurry is injected between the reactor system R1–R2 and the preheater PH. It is contemplated that if the injection point is at any other point in the system prior to reactor R2 then the static mixer SM will not be necessary and the output of R2 can be routed around the static mixer SM and into the preheater PH.

Alternatively, if it is undesirable to utilize the recycle stream for a carrier material in the SAS, an alternate carrier fluid may be introduced into the slurry system through feed line F15 from an independent carrier material source (not shown). In one particular embodiment such a carrier material could be mineral oil which is often used as a plasticizer in polystyrene materials. In such a case, it would only be necessary to close valve V6 and open valves V7 and V8 as well as valve V9.

Figure 2:
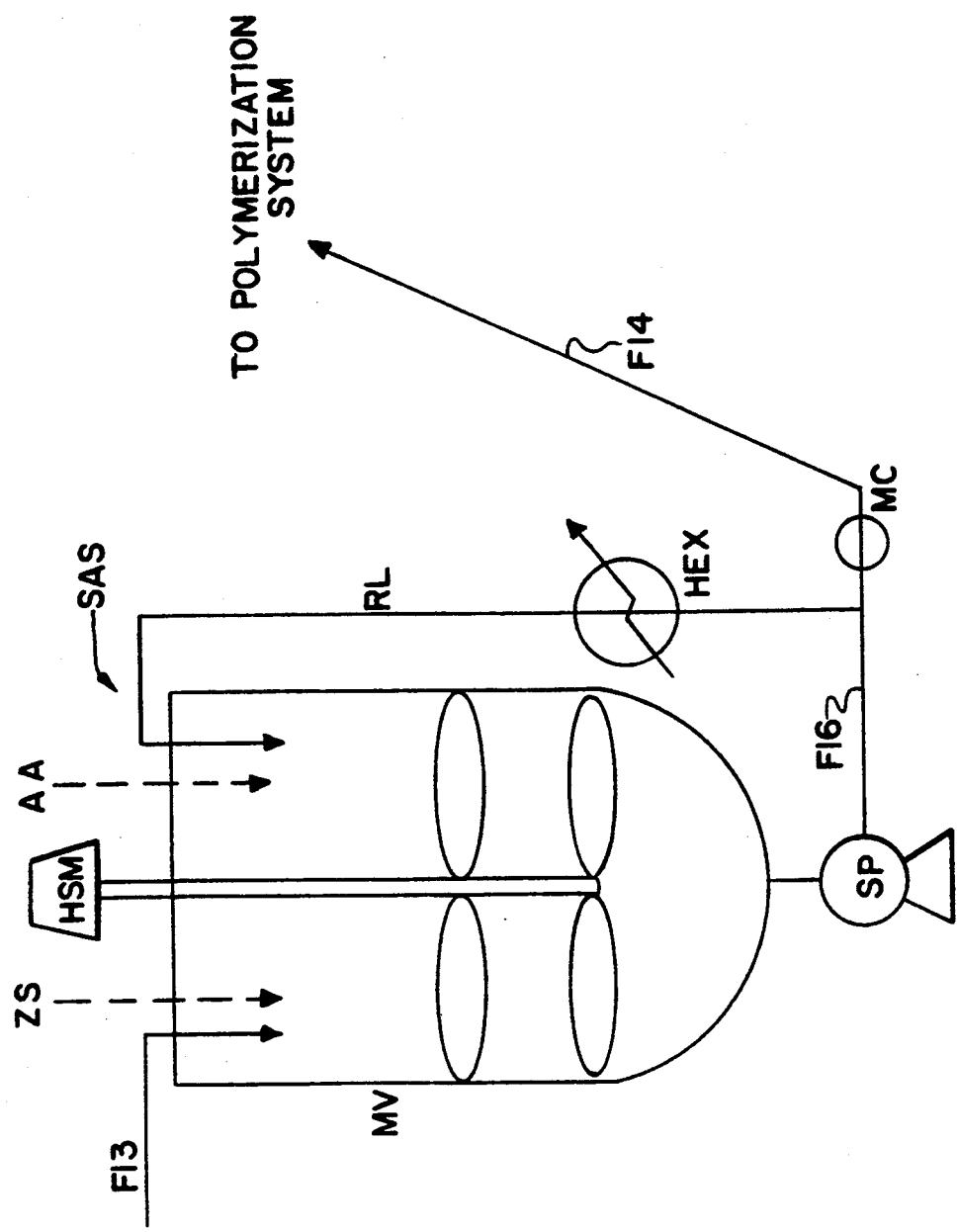
FIG. 2 is a schematic diagram of one embodiment of the slurry additive system for use in a polymerization process.

Referring now to FIG. 2, there is illustrated a detailed schematic drawing of the slurry additive system SAS of FIG. 1. The SAS comprises a high shear mixer HSM located in a mixing vessel MV and having the feed inlet line F13 flowing thereinto. A zinc stearate supply ZS, which is added as a solid is indicated in the dashed line next to flow line F13. Zinc stearate may be added to the vessel by any conventional means such as a vessel hatch or gear pump or other means for adding solid material into a closed vessel. The carrier fluid entering line F13, which as previously mentioned can be either mineral oil or the recycle stream from the devolatilzer DV, which primarily consists of about 80 to 90% styrene monomer, 5 to 10% ethylbenzene, and 5 to 10% xylenes, toluenes, and propyl-benzene, is added to the agitator MV along with zinc stearate from a ZS supply and subjected to high shear through the action of the high shear mixer. This forms a finely divided slurry of zinc stearate in the carrier fluid which is then pumped through volumetric slurry pump SP and out flow line F16. A mass controller MC is located in flow line F16 and a recycle loop RL is branched off of line F16 upstream mass control of MC and feeds back into vessel MV. This type of system is commonly known as a "pump-around" system. Thus the action of mass control MC, which may be a conventionally known valving system, allows a constant control of the feed amounts through line F14 to the polymerization system.

Any slurry that is not transported through line F14 is directed through return line RL back into the agitation of the high shear mixer HSM in vessel MV. This maintains a constant and consistent slurry of the zinc stearate in the carrier fluid and prevents settling out of the solids in the suspension. By controlling the amount of zinc stearate added to the mixing vessel MV and/or controlling the amount of recycle fluid, or alternate carrier fluid such as mineral oil, being added through lines F13 and F15, the amount of additive slurry entering the polymerization system through flow line F14 can be very precisely controlled. Conventional ratios of the slurry additive material are known to those skilled in the art and can be adjusted precisely through the use of mass controller MC and slurry pump SP. Temperature of the slurry is maintained at a desirable constant value by the utilization of heat exchanger HEX located in return line RL. In one preferred embodiment the temperature was maintained at about 70° F.

In addition to the placement of zinc stearate ZS into vessel MV, other additives can clearly be placed in the vessel to be slurried with the carrier fluid and the zinc stearate ZS. Such materials include those previously mentioned such as hindered phenols, anti-oxidants, solvents, initiators, and other such additives. The addition of other additives to the mixing vessel MV is indicated by a second dashed line designated at AA in FIG. 2. As another alternative, the carrier fluid for the slurry may be made up of virgin styrene monomer diverted from feedline F1, or can be a mixture of virgin monomer and recycle stream fluid, as well as other solvents compatible with the process, such as ethylbenzene. In addition, the high shear mixer may be utilized to disperse insoluble liquids in the chosen carrier fluid in place of or in addition to insoluble solids.

OPERATION OF THE PREFERRED EMBODIMENT

In typical operation, the slurry additive system SAS as illustrated more precisely in FIG. 2, is supplied with a carrier fluid such as a virgin styrene monomer, recycle styrene stream, or optionally, a mineral oil plasticizer, and one or more solid additives such as zinc stearate and anti-oxidants are placed in solid form into the closed vessel. There they are subjected to high shear and converted into a very finely divided suspension or slurry which is maintained by the constant action of a high shear mixer and a pump-around system. As the additives are needed, the slurry is pumped through a mass-controller into the polymerization system at any point prior to, in the middle of, or at the downstream end of the polystyrene polymerization reactor system. By utilizing the present invention, the need for heated zinc stearate vessels with nitrogen atmospheres are eliminated as well as the need for heated flow lines to prevent solidification of additives such as zinc stearate. The present invention provides a simple yet efficient means for injecting solid additives in a finely divided state into the styrene polymerization/copolymerization system as illustrated in FIG. 1. By controlling the amounts of solids added into the high shear mixer, slurries of known composition can be precisely obtained and injected into the polymerization system, very closely controlling the amount of additives and obtaining a fine, even distribution in the polymerizing sytrene.

It should also be noted that the optional heat exchanger HEX in line RL keeps the slurry at the desired temperature, or within a desirable temperature range. There is no need for a nitrogen atmosphere in the mixing vessel since it is a closed vessel and the head-space is completely filled with the vapors generated from the recycle stream carrier fluid, but a nitrogen atmosphere can be utilized if desired.

One particular additive utilized in styrene polymerization and added by the slurry additive system is solid zinc stearate. The agitation vessel MV was designed to maintain the particle size of the zinc stearate to less than 200 microns. The slurry was delivered to the polymerization process utilizing a volumetric pump SP to precisely control the concentration of the additive. The concentration of additives was adjusted to maintain proper viscosity, for example, approximately ten weight percent zinc stearate and ten weight percent Irganox 1076 were dispersed and added to the slurry system. If the soluble anti-oxidant Irganox were not to be utilized, then higher levels of zinc stearate could be used to maintain the viscosity. Irganox 1076 is soluble in styrene and thereby increases the viscosity of the solution. It was also found that by adding the anti-oxidant and other additives late in the process, i.e. for example, at the static mixer location, improved properties in the finished product could be obtained.

In summary, the slurry addition system is utilized to add heat-sensitive additives and additives that can possibly interfere in the early stages of the process into a monovinyl aromatic polymerization system.

Although a specific preferred embodiment of the present invention has been described in the detailed description and drawings above, the description is not intended to limit the invention to the particular forms or embodiments disclosed therein since they are to be recognized as illustrative rather than restrictive, and it would be obvious to thos skilled in the art that the invention is not so limited. For example, instead of using the present system to slurry solid insoluble additives in a carrier fluid, the system could be utilized to add commercially available preformed emulsions or dispersions, such as silicon oil/water and zinc stearate/mineral oil, by insuring that "settling-out" does not occur in these formulations. It is also contemplated that the present invention can be utilized successfully in polymerizing monomers other than monovinyl aromatics, such as ethylene, propylene, polyesters, and others. Thus, the invention is declared to cover all changes and modifications of the specific examples of the invention herein disclosed for purposes of illustration which do not constitute a departure from the spirit and scope of the invention.

The embodiments of the invention in which an exclusive property or privilege is claimed are defined as follows:

1. Apparatus for adding additives to a polymerization process, said apparatus comprising:
    a mixing vessel adapted to divide an additive into evenly-sized, finely-divided particles;
    an inlet flow line arranged to provide carrier fluid into said mixing vessel;
    an entry port in said mixing vessel for receiving additive materials;
    an exit port, a flow line connected to said exit port, adapted to transmit a slurry from said mixing vessel; and,
    a flow control and measurement system connected to said exit port flow line arranged to measure and control the amount of said slurry flowing out of said exit port flow line.

2. The mixing apparatus of claim 1 wherein said vessel comprises a high shear mixer arranged to divide additives into particles, a substantial percentage of which are below about 200 microns in size, and further adapted to mix said particles with said carrier fluid and form and maintain a slurry thereof.

3. The mixing apparatus of claim 2 wherein said flow control and measurement system comprises a volumetric pump and a mass controller, connected in series.

4. The mixing apparatus of claim 3 wherein said flow control and measurement system further comprises a pump-around loop leading back into said mixing vessel from a point between said volumetric pump and said controller.

5. The mixing apparatus of claim 4 further comprising a heat exchanger arranged to maintain the slurry in said mixing vessel at a desirable temperature within a predetermined desirable range.

6. The mixing apparatus of claim 5 wherein said heat exchanger is located in said pump-around loop.

7. In a polymerization reactor system wherein virgin monomer feedstock is polymerized into a polymeric product containing desirable additives, the improvement comprising of a slurry additive system comprising:
    a high-shear mixing vessel adapted to divide an additive material into evenly-sized, finely-divided particles;
    an inlet flow line arranged to transmit a fluid into said mixing vessel;
    an entry port in said vessel for receiving additive materials;
    an exit port in one end of said vessel connected to a slurry supply line leading to said polymerization reactor system;
    a flow control and measurement assembly in said slurry supply line arranged to measure and control the amount of slurry flowing therethrough; and,
    a pump-around loop consisting of a flow line leading from said exit port back into an opposite end of said vessel.

8. The slurry additive system of claim 7 further comprising a heat exchanger in said system arranged to maintain the slurry in said mixing vessel within a desirable temperature range.

9. The slurry additive system of claim 7 wherein said polymerization reactor system has a recycle stream flowline for recycling unreacted monomer from the output of said reactor system back into the reactor system, the slurry additive system further comprising a recycle supply line from said recycle stream flowline into said mixing vessel.

10. The slurry additive system of claim 7 wherein said polymerization reactor system has a virgin monomer supply line leading thereinto and said improvement further comprises a flowline from said monomer supply line into said mixing vessel.

11. The slurry additive system of claim 7 wherein said inlet flowline is connected to said entry port for supplying previously prepared emulsions and dispersions into said mixing vessel.

12. The slurry additive system of claim 7 wherein said inlet flowline enters said mixing vessel at a point separate from said entry port.

* * * * *